June 27, 1967 D. A. BECKER 3,328,645

CABLE TELEVISION CIRCUIT BOX ASSEMBLY

Filed June 27, 1966 2 Sheets-Sheet 1

INVENTOR.
DALTON A. BECKER
By White & Haefliger
ATTORNEYS.

CABLE TELEVISION CIRCUIT BOX ASSEMBLY

Filed June 27, 1966

2 Sheets-Sheet 2

INVENTOR.
DALTON A. BECKER
By White & Haefliger
ATTORNEYS.

United States Patent Office 3,328,645

Patented June 27, 1967

3,328,645

CABLE TELEVISION CIRCUIT BOX ASSEMBLY

Dalton A. Becker, Santa Ana, Calif., assignor to Anaconda Astrodata Co., Anaheim, Calif., a corporation of Delaware Filed June 27, 1966, Ser. No. 560,695
9 Claims. (Cl. 317—100)

This invention relates generally to cable television systems, and more particularly concerns improvements in such systems leading to less system error, reduced distortion, reduced noise and greater accuracy of field measurement of signal levels at system test points.

Cable television systems have in the past suffered from variations in signal attenuation and distortion resulting from causes that include use of jumper cable at amplifier locations, test point mismatch, arbitrary cable splices, and other built-in inaccuracies particularly at amplifier locations. Such errors and inaccuracies are compounded due to amplifier cascading, and as a result, it is often extremely difficult if not impossible to obtain flat frequency response by adjustments of amplifiers in the field.

It is a major object of the present invention to provide a cable television circuit box assembly constructed in such manner as to substantially reduce and in many instances obviate such errors and inaccuracies. Basically, the assembly comprises a receptacle with attached or built-in cable terminals, a circuit board to mount television signal processing components, a metallic plate supporting the circuit board and received into the receptacle interior so that the circuit components have tight removable electrical connection with the cable terminals, the plate connected in electrical grounding and heat sink relation with circuit components and also attached to the receptacle, and a removable cover attached to and closing the receptacle, with full sealing action. The cable terminal typically includes a tubular fitting attached to the receptacle wall with a portion formed for connection to a cable exteriorly of the receptacle, and the fitting has a pin projecting into the receptacle interior and electrically connectible with the attached cable center conductor. Further, the assembly typically includes a spring clip carried to clip-attach to the pin upon insertion of the circuit board into the receptacle interior, the clip having electrical connection with the board circuit. As a result, the need for jumper cables is avoided, obviating their inherent error introducing properties.

Other unusually advantageous features of the invention include the provision of an insulative enclosure protectively enclosing circuit components on the board and extending at the cover side of the board so as to prevent field adjustments that would misalign the amplifier or circuit; the provision of hinge structure extending from the interior of the receptacle to the cover to hinge connect the cover to the receptacle with the hinge protectively enclosed within the receptacle and thereby allowing clamping of an endless loop sealing gasket between the cover and receptacle rim; the provision of an unusually advantageous clamp device attached to the receptacle to adjustably engage a support wire or line, thereby to hang the receptacle from the line; and the provision of other features to be described.

These and other objects and advantages of the invention, as well as the details of an illustrative embodiment, will be more fully understood from the following detailed description of the drawings, in which.

Figures 3, 5, 6, 7, 8:
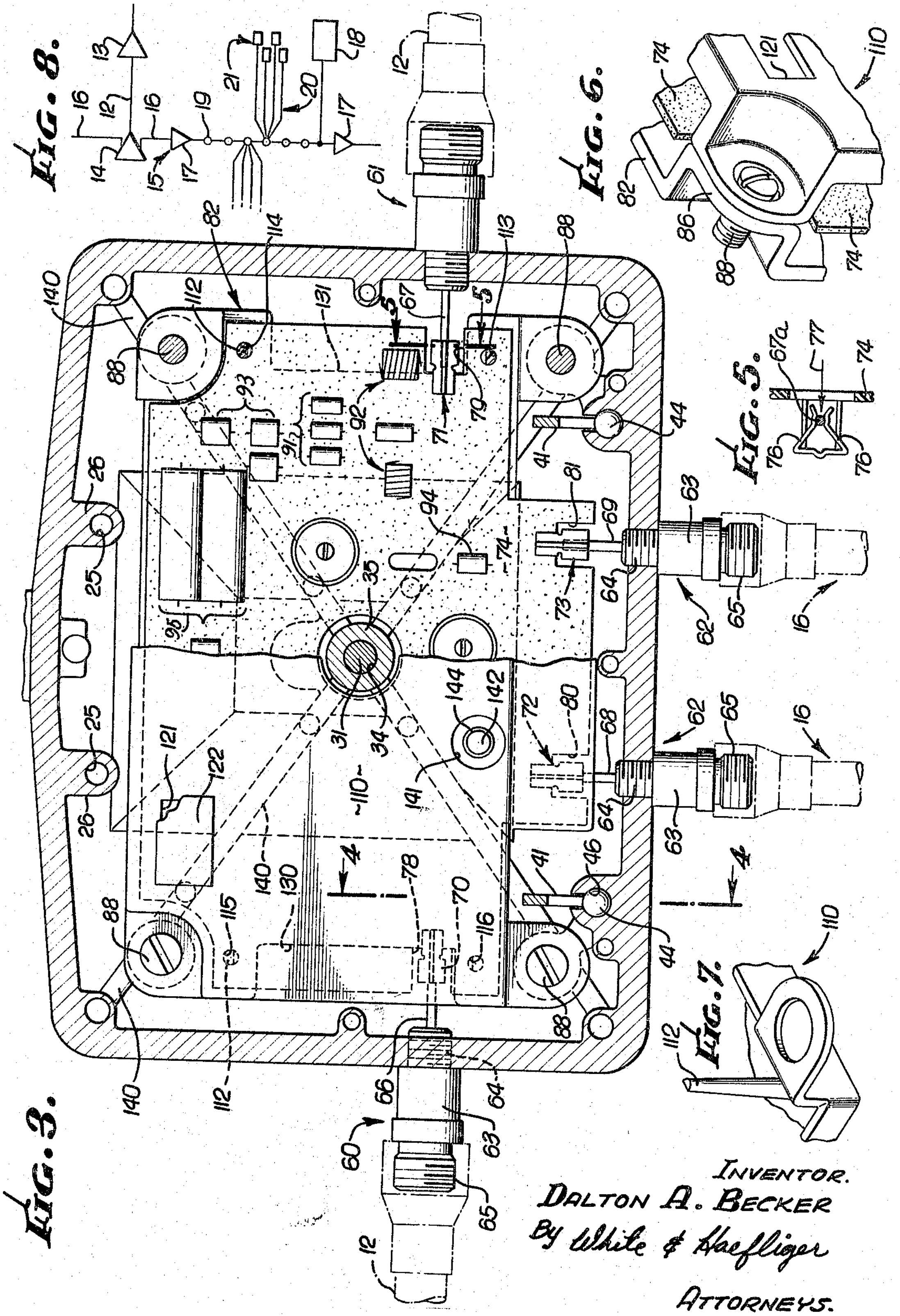
FIG. 3 is a section taken on line 3—3 of FIG. 2.
FIG. 5 is a section taken on line 5—5 of FIG. 3 to show the spring-clip structure.
FIG. 6 is a perspective showing of the manner in which the circuit board is assembled between the metal support plate and transparent enclosure.
FIG. 7 is a perspective view of a corner portion of the transparent enclosure showing an attachment lug.
FIG. 8 is a block diagram showing a portion of a cable television system.

Referring first to FIG. 8, a segment of main trunk consisting of coaxial cable 12 is connected in series with amplifiers 13 spaced along the cable. Such amplifiers are contained within box-type receptacles indicated generally at 10 in FIG. 1 and suspended for example by wire or line 11 strung between telephone poles 11*a*. AGC amplifiers may also be connected in series with the cable to provide automatic correction for changes in signal level. The main trunk also includes bridging amplifiers 14, each having several outputs and enough gain to make up for isolation loss and power loss inherent in multiple outputs. From the bridging amplifiers, which may also be enclosed within receptacles 10, feeder lines 15 are run along a row of subscribers' houses. The feeder lines include coaxial cable 16 and line extender amplifiers 17 operable to compensate for the loss in the feeder system. As an example, each feeder line may include four to ten or more line extender amplifiers. Power to the cables 16 is supplied as by the transformers 18 or other sources. Between successive amplifiers 17 directional taps or couplers 19 are provided, typically with multiple outputs 20 to which individual home receivers 21 are connected, such taps being known devices. For example, a four house tap is typically used every 150 feet.

Referring to FIGS. 1 to 4, the illustrated assembly includes a receptacle 22 which may typically consist of a metallic casting having internal ribbing at 140. A removable cover 23 for the receptacle is hinge connected to the receptacle to swing upward to the position seen in FIG. 2, and two guide pins 24 on the cover fit into openings 25 drilled into receptacle bosses 26, thereby to exactly locate a sealing gasket 27 in position to be clamped between the cover and receptacle rim 28. The gasket 27 is shown as normally carried by the cover as by reception within a groove 29 formed in the cover rim 30, the gasket being in the form of an endless loop and consisting of a suitable elastomer or plastic material. Clamping of the gasket is effected by a central fastener 31 having a head 32 exposed at the front exterior of the cover, and a shank 33 received through an opening 34 drilled in a cover boss 35 so that the threaded portion 36 of the fastener may be received into the threaded opening 38 in a central boss 37 integral with the receptacle and projecting therein. Interengagement of the two bosses 35 and 37 at 39 limits the clamping force transmitted to gasket 27.

The cover hinge means generally indicated at 40 extends from the interior of the receptacle to the cover to hinge connect the cover to the receptacle in spaced relation to all portions of the cover and gasket between which the gasket is clamped. One unusually advantageous form of hinge means includes two hook shaped brackets 41, each of which has one end thereof pivotally connected at 42 to the cover, and the opposite end thereof pivotally connected at 43 to the receptacle. The latter connection is defined by a ball 44 on the end of bracket arm 45 and received in rearwardly elongated receptacle groove 46, which is plugged at forward location 47. The bracket connections facilitate rotation of the brackets and bodily displacement thereof between positions seen in FIGS. 4 and 2, so that the brackets project outside the receptacle when the cover is swung fully open, and they are rotated and bodily displaced into the receptacle when the cover clamps the gasket.

Figures 1, 2, 4:
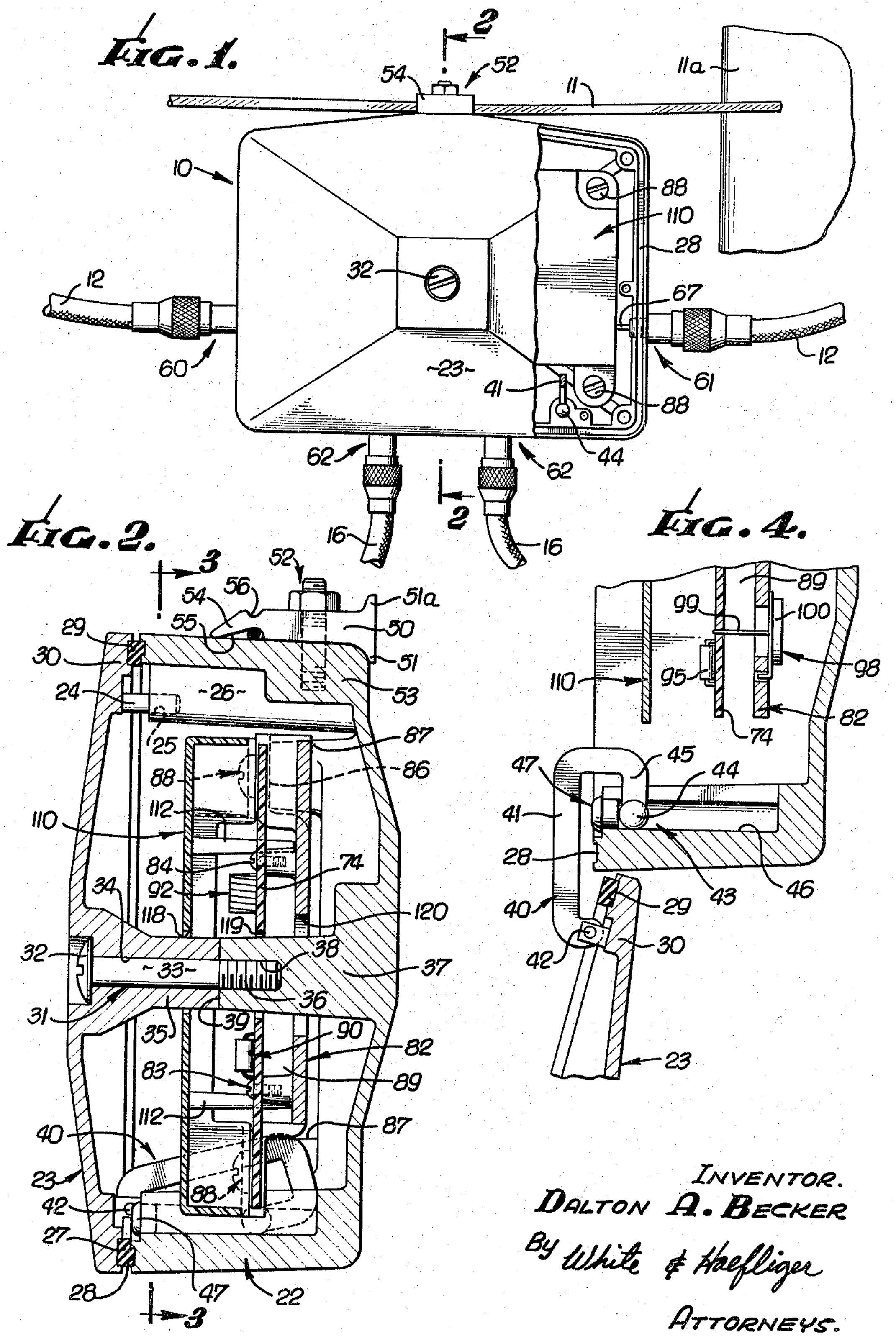
FIG. 1 is a front elevation showing the receptacle supported from a suspending line or wire.
FIG. 2 is an enlarged section taken on line 2—2 of FIG. 1.
FIG. 4 is an enlarged section illustrating the cover hinging structure in relation to the endless loop gasket.

FIGS. 1 and 2 also illustrate the provision of clamp means attached to the receptacle for adjustable clamping connection to external support structure, as for example wire 11. One unusually advantageous form of clamp means includes a lever 50 having fulcrums 51 and 51*a* engageable with the receptacle to allow limited pivoting of the lever when fastener 52 is loosened, the fastener adjustably urging the lever toward the receptacle top 53. The lever also has a clamp portion 54 transversely grooved at lower and upper locations 55 and 56 to rapidly hook over support structure, i.e. wire 11 of different sizes. Accordingly, the lever is reversible and thereby made adaptable to positively clamp the receptacle to wire strands 11 of different sizes, the groove 56 being smaller than groove 55 to accommodate a smaller strand. Positive clamping is desired in order to prevent lengthwise slippage of the receptacle along the support wire.

Referring to FIGS. 1 and 3, the receptacle 22 has cable terminal means attached thereto, as for example are seen at the input and output locations 60 and 61 for trunk coaxial cable 12 and at the output locations 62 for supplying television signals to distribution coaxial cable 16. Each cable terminal typically includes a tubular fitting 63 attached to the receptacle wall as by threading 64, and having a nipple portion 65 formed for connection to the trunk or distribution cable exteriorly of the receptacle. The fitting 63 includes a central terminal pin 66 projecting into the receptacle interior and electrically connectable with the exterior cable central conductor when cable is attached to fitting 63 as by threading on at 65. Pin associated with the other cable terminals are designated at 66–69.

The pins 66–69 are adapted to clip-attach to spring clips 70–73 upon insertion of a circuit board 74 into the receptacle interior, each clip mounted on board 74 and having suitable electrical connection with the board circuit. The board 74 is easily and rapidly inserted into the receptacle with the cover 23 in FIG. 4 position, such insertion simultaneously accomplishing electrical connection to the exterior cables via the pins 66–69. For this purpose the clips 70–73 may be formed as seen in FIG. 5, with opposite spring arms 76 tightly fitting over a pin, 67*a* for example, that has been received between the arms in the direction indicated by the arrow 77. Note that the board 74 is cut-out at locations 78–81 to relatively pass the pins 66–69 as the board is inserted, facilitating connection of the pins to the clips. Circuit components on the board are illustrated at 90–95.

The circuit board is removably attached to an underlying metallic plate 82 at fastener locations 83 and 84 seen in FIG. 2, the plate having metallic bosses to receive the fasteners and also to support the circuit board. The plate 82 is received into the receptacle interior with plate ears 86 fastened to receptacle bosses 87 via threaded fasteners 88. The latter act as guide means to orient the plate and thereby align the board 74 and the spring clips thereon relative to the pins 66–69. Note that the flexing capacity of the spring clip arms 76 accommodates slight misalignment of the spring clips and pins. The ears 86 are offset from the main extent of the plate, to provide cooling space 89 between the plate 82 and board 74 and into which certain circuit components or elements thereof may project. Thus, as seen in FIG. 4, a transistor 98 has a terminal 99 projecting from can 100 through cooling space 89 and into electrical contact with the circuit on board 74. The transistor 100 is spaced from board 74 to minimize heat transfer therebetween. Also, heat is conducted from can 100 directly to the plate 82, which serves as a heat sink and also as an electrical ground for the circuit components. Plate 82 is cut away at locations 130 and 131 to pass pins 66 and 67 upon assembly of the plate into the receptacle.

Finally, the assembly includes an insulative enclosure 110 protectively enclosing circuit components such as 90 and 92 seen in FIG. 2. For this purpose, the enclosure may be made of clear plastic, and extends at the receptacle cover side of the circuit board so that the components will not be directly exposed to the exterior when cover 23 is opened. FIG. 7 indicates the provision of tapered leg 112 integral with the enclosure 110, and sized to fit and be held by a suitable fastener within aligned opening 113 formed in plate 82, after passing through a corresponding opening in the circuit board. Four of such legs are provided, proximate the respective corners of the enclosure 110, and to fit within plate openings at locations 113–116, thereby to releasably yet firmly attach the enclosure to the assembly. The sub-assembly that includes plate 82, board 74 and enclosure 110 can be quickly and easily removed, and replaced by a new sub-assembly, as facilitated by fasteners 88.

Note that central openings 118–120 are provided in the enclosure 110, board 74 and plate 82 to pass the bosses 35 and 37. The enclosure 110 has another opening at 121 to receive a three position plug 122 accessible from the exterior after opening cover 23, plug 122 being insertable to connect with the circuit board for (*a*) effecting a connection to shunt cable transmitted electrical power through the board, i.e., between input and output trunk cables 12, (*b*) bringing power into the amplifier from an input connector, blocking power to the output, or (*c*) bringing power from the output side of the amplifier to the amplifier, blocking power to the input.

Circuit components on the board 74 may typically consist of solid state amplifier components, as for example are used at 14 in FIG. 8. Test point locations are defined as by threaded terminal 144 on board 74 accessible to a test probe through opening 141 in enclosure 110, the probe center conductor adapted to engage test point center conductor 142, and other such test points may be provided.

I claim:

1. For use in a cable television system including cable to transmit multiple channel television signals for distribution to subscriber equipment, an assembly comprising a receptacle and cable terminal means attached thereto, an electrical circuit board for circuit components, a metallic plate supporting said board and received therewith into the receptacle interior so that circuit components have tight removable electrical connection with said cable terminal means, the plate being releasably attached to the receptacle, and a removable cover attached to and closing said receptacle at the front thereof, the main extent of the plate being spaced from the main extent of the board and at the side of the board opposite the cover, at least one heat producing circuit component mounted on the plate and having electrical connection with the board circuit, said cable terminal means including a tubular fitting attached to the receptacle wall and having a portion formed for connection to a cable exteriorly of the receptacle, the fitting including a pin projecting into the receptacle interior and electrically connectable with the cable conductor, and said assembly including a spring clip carried by the circuit board proximate the edge thereof to clip-attach to the pin upon insertion of the circuit board and plate into the receptacle interior, the clip and pin being exposed at the cover side of the board and the clip having electrical connection with the board circuit.

2. The assembly of claim 1 including clamp means attached to the receptacle for adjustable clamping connection to external support structure.

3. The assembly of claim 2, in which said clamp means includes a lever having a fulcrum engageable with said receptacle, a grooved clamp portion spaced from the fulcrum to hang over a support wire, and means to adjustably urge the lever toward the receptacle so that the wire is confined in the groove between the receptacle and lever.

4. The assembly of claim 1 including guide means carried by the plate and receptacle to interfit upon insertion of the plate into the receptacle thereby to align the spring clip for clip-on attachment to the pin upon plate insertion into the receptacle, the plate when attached to the receptacle being out of frontal alignment with the pin so as to be insertable rearwardly into the receptacle past the pin.

5. The assembly of claim 1 including an insulative enclosure protectively enclosing circuit components on the board, the enclosure extending at the cover side of the board.

6. The assembly of claim 5 including structure extending within the receptacle interior and holding the cover attached to the receptacle, said board, plate and enclosure forming openings to pass said structure which includes receptacle and cover bosses and a fastener holding said bosses in interengagement, the fastener having a head accessible at the exterior of the cover.

7. The assembly of claim 6 including a gasket in the form of an endless loop clamped between the cover and receptacle, interengagement of said bosses limiting clamping force transmission to the gasket, and hinge means extending from the interior of the receptacle to the cover to hinge connect the cover to the receptacle in spaced relation to all portions of the cover and receptacle between which the gasket is clamped, the fastener being generally centrally located with respect to the gasket.

8. The assembly of claim 5, in which the enclosure has an opening, and a plug receivable in the opening and accessible at the cover side of the enclosure, the plug having releasable electrical connection with a circuit component element between the plate and enclosure.

9. The assembly of claim 7 in which the hinge means includes a bracket pivotally connected to the cover and having an extended position in which the bracket projects outside the receptacle when the cover is swung fully open, and a retracted position in which the bracket is rotated and bodily displaced into the receptacle when the cover clamps the gasket.

References Cited

UNITED STATES PATENTS

| | | | |
|---|---|---|---|
| 1,130,482 | 3/1915 | Davis | 317—120 |
| 2,754,453 | 7/1956 | Noell | 317—101 |
| 3,105,108 | 9/1963 | Brazee | 174—70.4 X |
| 3,140,425 | 7/1964 | Cade | 317—101 |
| 3,200,296 | 8/1965 | Bruestle | 317—100 |

ROBERT K. SCHAEFER, *Primary Examiner.*

M. GINSBURG, *Assistant Examiner.*